(12) United States Patent
Shukla et al.

(10) Patent No.: US 8,237,870 B2
(45) Date of Patent: Aug. 7, 2012

(54) RECEIVER SYSTEM FOR MULTIPLE BANDWIDTH TELEVISION CHANNELS

(75) Inventors: Parveen K Shukla, Meadows (GB); Bernard Arambepola, Enfield (GB); Thushara Hewavithana, Borehamwood (GB)

(73) Assignee: Intel Corporation, Santa Clara, CA (US)

( * ) Notice: Subject to any disclaimer, the term of this patent is extended or adjusted under 35 U.S.C. 154(b) by 1285 days.

(21) Appl. No.: 11/863,748

(22) Filed: Sep. 28, 2007

(65) Prior Publication Data

US 2009/0086107 A1 Apr. 2, 2009

(51) Int. Cl.
| | |
|---|---|
| H04L 27/06 | (2006.01) |
| H04L 27/08 | (2006.01) |
| H04B 1/16 | (2006.01) |
| H04B 1/26 | (2006.01) |
| H04B 15/00 | (2006.01) |
| H04N 7/12 | (2006.01) |
| H04N 11/02 | (2006.01) |
| H04N 11/04 | (2006.01) |
| H04N 5/00 | (2006.01) |
| H04N 9/64 | (2006.01) |
| H04N 5/44 | (2006.01) |
| H04N 5/455 | (2006.01) |
| H04N 5/50 | (2006.01) |
| H04N 5/46 | (2006.01) |

(52) U.S. Cl. ............ 348/729; 348/342; 348/388.1; 348/607; 348/618; 348/720; 348/721; 348/725; 348/726; 348/735; 375/344; 375/345; 455/216; 455/313

(58) Field of Classification Search .................. None
See application file for complete search history.

(56) References Cited

U.S. PATENT DOCUMENTS

| | | | | |
|---|---|---|---|---|
| 5,654,799 A | * | 8/1997 | Chase et al. | 356/600 |
| 6,166,776 A | * | 12/2000 | Moon | 348/555 |
| 2002/0159551 A1 | * | 10/2002 | Ekvetchavit et al. | 375/350 |
| 2006/0055824 A1 | * | 3/2006 | Zhu et al. | 348/554 |
| 2007/0041480 A1 | * | 2/2007 | Azakami et al. | 375/345 |
| 2009/0103636 A1 | * | 4/2009 | Stewart | 375/240.27 |

* cited by examiner

*Primary Examiner* — Joseph P Hirl
*Assistant Examiner* — Mary A Kay
(74) *Attorney, Agent, or Firm* — Grossman, Tucker, Perreault & Pfleger, PLLC

(57) ABSTRACT

Disclosed is a receiver system, capable of receiving RF signals on television channels of multiple bandwidths. The receiver system includes a tuner, an analog IF filter, an ADC, a mixer module, one or more digital filters, an AGC module and a controller. The tuner converts an RF signal into an IF signal using a mixer frequency. The analog IF filter filters out a fixed band signal from the IF signal. The ADC module converts the fixed band signal into a digital signal, which is filtered by digital filters. The output of the digital filters is converted to a base band signal and the power level of the base band signal is controlled by the AGC module. The controller selects a mixer frequency from a group of mixer frequencies based on a function of power of the output of the AGC module by applying each mixer frequency to the tuner.

8 Claims, 2 Drawing Sheets

RECEIVER SYSTEM FOR MULTIPLE BANDWIDTH TELEVISION CHANNELS

FIELD OF THE DISCLOSURE

The present disclosure relates to a receiver system and, more particularly, to a digital receiver used in receiving multiple bandwidth television channels.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

The present disclosure provides a low-cost receiver front-end with high performance in a multi-band television application. The receiver system of the present disclosure is capable of receiving Radio Frequency (RF) signals on television channels of multiple bandwidths. In some countries, multiple bandwidths for television (TV) channels are used. For example, the bandwidth of the TV channels may be 6, 7 and 8 MHz. However, the bandwidth of the TV channels may vary from country to country. The present disclosure provides a single analog Intermediate Frequency (IF) filter that may be used in case of television channels of multiple bandwidths.

Figure 1:
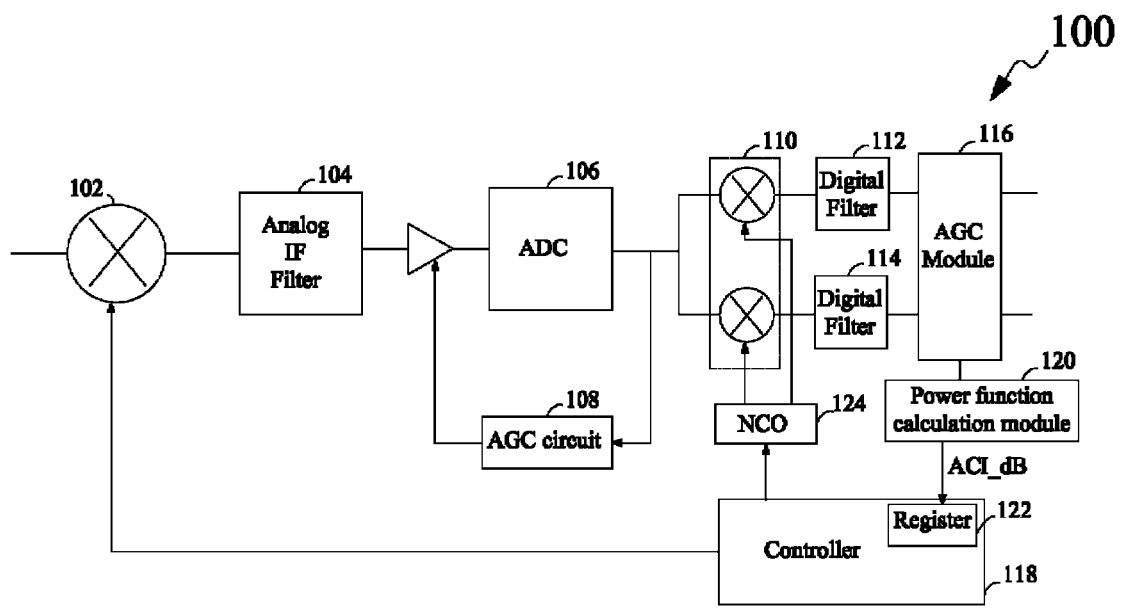
FIG. 1 is a schematic block diagram illustrating a receiver system 100, according to an exemplary embodiment of the present disclosure.

Referring to FIG. 1, a schematic block diagram illustrating a receiver system 100 is shown, according to an exemplary embodiment of the present disclosure. The receiver system 100 may be used in a digital television and a set-top box. The receiver system 100 may operate with multiple bandwidth TV systems using a single analog IF filter. The receiver system 100 receives RF signals, which may include signals corresponding to television channels of multiple bandwidths. The receiver system 100 comprises a tuner 102, an analog IF filter 104, an analog to digital converter (ADC) 106, an Automatic Gain Control (AGC) circuit 108, a mixer module 110, one or more digital filters such as a digital filter 112 and a digital filter 114, an Automatic Gain Control (AGC) module 116, a controller 118, power function calculation module 120 and a register 122. The tuner 102 mixes an RF signal of multiple bandwidths with a mixer frequency to convert the RF signal into an IF signal. The analog IF filter 104 (hereinafter referred to as 'filter 104') filters out a fixed band signal from the IF signal. In an embodiment of the present disclosure, the bandwidth of the filter 104 is equal to the highest bandwidth amongst the multiple bandwidths of the television channels that is received by the tuner 102. For example, when the bandwidths of the television channels are 6, 7 and 8 Mhz, a filter of 8 Mhz is chosen as the filter 104. In an exemplary embodiment of the present disclosure, the filter 104 is a Surface Acoustic Wave (SAW) IF filter.

The output of the filter 104 is fed to the ADC 106. The ADC 106 samples the fixed band signal and converts the fixed band signal to a digital signal. The AGC circuit 108 is also used for optimizing the performance of the ADC 106. The AGC circuit 108 controls power level of the digital signal by maintaining a constant level of power. The purpose of the AGC circuit 108 is to smoothen an instantaneous variation in the digital signal. The instantaneous variation in the digital signal may occur due to noise. However, it will be apparent to a person skilled in the art that the input to the ADC 106 is a complete signal, including wanted as well as unwanted signals, as shown in FIGS. 2A and 2B.

Figure 2A:
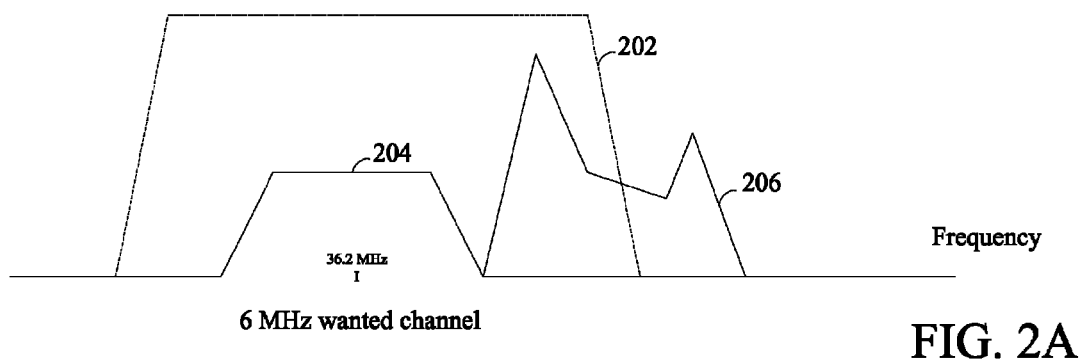
FIG. 2 is a schematic plot illustrating multiple bandwidth television channels and an analog IF filter, according to an exemplary embodiment of the present disclosure.
Figure 2B:
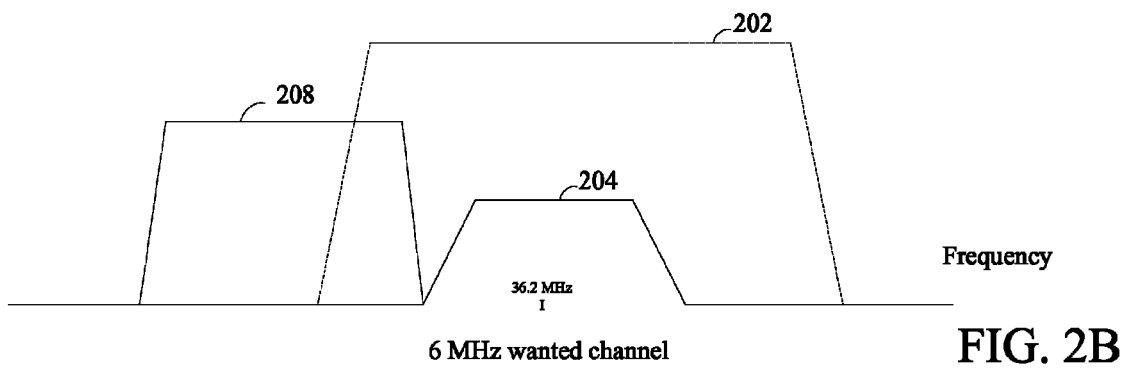

Referring now to FIGS. 2A and 2B, illustrated are the plots of television channels of multiple bandwidths and a bandwidth of signals filtered out by the filter 104. FIG. 2A represents a plot 202 corresponding to a pass band of the filter 104, a plot 204 corresponding to bandwidth of a wanted channel and a plot 206 representing an upper adjacent channel. The bandwidth of the filter 104 is shown as 8 MHz whereas the bandwidth of the wanted channel is shown as 6 MHz. It will be obvious to a person skilled in the art that by the use of the filter 104 of 8 MHz bandwidth, along with wanted signal corresponding to the wanted channel of bandwidth of 6 MHz, some portion of the upper adjacent channel may be filtered out and given to the ADC 106. The portion of the upper adjacent channel may be termed as a part of unwanted signals. Similarly, FIG. 2B represents the plot 202, the plot 204 and a plot 208 corresponding to a lower adjacent channel. It will also be obvious to a person skilled in the art that along with the wanted signal some portion of the lower adjacent channel may be filtered out and may be given to the ADC 106.

The present disclosure builds upon the fact that the most of the compliance tests which are currently used are based on an adjacent channel of a high power either above or below the frequency of the wanted channel. This can again be supported by the observation that the probability of both the upper adjacent channel and the lower adjacent channel of high power being adjacent at the same time to the wanted channel, is small. The present disclosure uses this fact in an algorithm to improve the performance of the receiver system 100, which is described later in this description.

Referring again to FIG. 1, the digital signal generated by the ADC 106 is fed to the mixer module 110. The mixer module 110 mixes a base band conversion frequency to the digital signal for converting the digital signal into a base band digital signal. This baseband signal contains wanted as well as unwanted signal components as shown in FIG. 2A/B, as the analogue filter 104 has a bandwidth larger than the signal bandwidth, and so allows through portions of any adjacent channels that are present. The unwanted signal components in this case are defined as those outside the bandwidth of the wanted signal. The adjacent channels may be analogue TV channels, and FIG. 2A shows the typical shape of one, present in this case as an upper adjacent channel. The adjacent analogue TV channel in FIG. 2A has a large component on the left (known as the "vision carrier") that passes through the analogue filter 104, and this may cause the unwanted signal power at the input to the ADC 106 to be several times higher than the wanted signal power. The wanted signal component is properly centered at baseband by the digital mixer 110. The frequency for mixer 110 is provided by NCO 124, which in turn is set by the Controller 118. The Controller 118 also sets the frequency of analogue mixer 102. The selected frequency for digital mixer 110 is based on the selected frequency for analogue mixer 102. The base band digital signal, which may contain unwanted components outside its bandwidth, is then filtered using the digital filters 112 and 114. The digital filters 112 and 114 are software programmable such that their bandwidths can be chosen to match that of the wanted signal. In this case the wanted signal is the digital TV channel, which may have a bandwidth of 5, 6, 7 or 8 MHz. In an embodiment of the present disclosure, the digital filters 112 and 114 are eighth order elliptic IIR filters. The outputs of the digital filters 112 and 114 contain the wanted signal only (the unwanted signal has been filtered out), and these are provided to the AGC module 116. The AGC 116 controls the power level of the output of the digital filters 112 and 114, and its function is to adjust the power level such that it is equal to the input power level of the digital filters 112 and 114. If the unwanted signal level at the input to the digital filters 112 and 114 is high, then the AGC 116 will need to amplify the output of the digital filters 112 and 114 in order to restore the power level to that of the input. The amount of gain applied by AGC 116 is in fact proportional to the amount of unwanted signal power present at the input to the digital filters 112 and 114. The purpose of the power function calculation module 120 is to calculate the metric ACI_dB (see FIG. 1), which indicates the amount of unwanted signal power. Assume the power level at the output of ADC 106 is P1. Then the power level at the input of digital filters 112 and 114 will also be P1 (the digital mixer 110 does not change this). Assume the signal power at the input of AGC 116, which is the wanted signal power, is P2, and the gain of the AGC 116 is G1. Then the relationship between the power ratios is $G1^2 = P1/P2$. Therefore we can use the gain of the AGC module 116 to calculate $ACI\_dB = 20 \cdot \log 10(G1)$. If the gain G1=1, then ACI_dB=0 to indicate no unwanted signal, and if G1>1 then ACI_dB>0 to indicate the presence of unwanted signal. The higher the value of ACI_dB, the greater the power of unwanted signal present. The controller 118 searches for a frequency for analogue mixer 102, from a group of mixer frequencies, which provides the smallest value for the metric ACI_dB. The controller 118 also determines the base band conversion frequency for digital mixer 110, based on the current frequency setting for analogue mixer 102, and provides this to NCO 124.

The controller 118 selects the mixer frequency based on an algorithm, which uses a function of power of the output of the AGC module 116. In this exemplary embodiment of the present disclosure, the function of power is a ratio of the total power to the power of wanted signal. However, it will be apparent to a person skilled in the art that the function of power essentially includes power of the wanted signal and may also include other mathematical expressions. The algorithm includes calculating a set of values of the function by applying each mixer frequency of the group of mixer frequencies and choosing a mixer frequency that gives an optimum performance in terms of the power level of the wanted signal.

Therefore, the power function calculation module 120 is used to calculate the set of values of the function of power of the output of the AGC module 116. Each of the set of values corresponds to each mixer frequency of the group of mixer frequencies that is applied to the tuner 102. Again, the register 122 is used for storing the set of values of the function of power of the output of the AGC module 116. In an embodiment of the present disclosure, the register 122 is shown as a part of the controller 118. In another embodiment of the present disclosure, the register 122 may be placed outside of the controller 118. Similarly, in another embodiment of the present disclosure, the power function calculation module 120 may also be placed in the controller 118 or the AGC module 116.

The present disclosure provides the algorithm for improving the performance of the receiver system 100, which may be described with the following example. Considering a case when the multiple bandwidth of the television channels are 6, 7 and 8 MHz and bandwidth of the wanted channel is 6 MHz. Let the bandwidth of the filter 104 be equal to 8 MHz. The algorithm selects a mixer frequency from the group of mixer frequencies to improve the performance of the receiver system 100.

The controller 118 selects a first mixer frequency of the group of mixer frequencies such that the wanted channel is at the center of the filter 104 (for example, 36.2 MHz) as shown in the FIGS. 2A and 2B. Further, the controller 118 sets the base band conversion frequency to −36.2 MHz. Again, when the AGC module 116 locks, the power function calculation module 120 calculates the function of power of the output of the AGC module 116. In this exemplary embodiment of the present disclosure, the function of power is a ratio of the total power to the power of wanted signal. The function is shown as ACI_dB in FIG. 1. The value of the function ACI_dB is stored in the register 122. In this exemplary embodiment, the value of the function ACI_dB may be termed as ACI_dB_1, which corresponds to the first mixer frequency of the group of mixer frequencies.

The controller 118 selects a second mixer frequency of the group of mixer frequencies such that the wanted channel is 1 MHz higher than the center of the filter 104, which is 36.2 MHz. In this case, the wanted channel is centered at 37.2 MHz with a bandwidth of 6 MHz. Further, the controller 118 sets the base band conversion frequency to −37.2 MHz. Again, when the AGC module 116 locks, the power function calculation module 120 calculates the function of power of the output of the AGC module 116. The value of the function ACI_dB is stored in the register 122. In this exemplary embodiment, the value of the function ACI_dB may be termed as ACI_dB_2, which corresponds to the second mixer frequency of the group of mixer frequencies.

Again, the controller 118 selects a third mixer frequency of the group of mixer frequencies such that the wanted channel is 1 MHz lower than the centre of the filter 104, which is 36.2 MHz. In this case, the wanted channel is centered at 35.2 MHz with a bandwidth of 6 MHz. Further, the controller 118 sets the base band conversion frequency to −35.2 MHz. Again, when the AGC module 116 locks, the power function calculation module 120 calculates the function of power of the output of the AGC module 116. The value of the function ACI_dB is stored in the register 122. In this exemplary embodiment, the value of the function ACI_dB may be termed as ACI_dB_3, which corresponds to the third mixer frequency of the group of mixer frequencies.

The algorithm further compares values of ACI_dB_1, ACI_dB_2 and ACI_dB_3 as calculated previously. The controller 118 selects a minimum value among the ACI_dB_1, ACI_dB_2 and ACI_dB_3. Let the ACI_dB_2 be the minimum value, the controller 118 selects the second mixer frequency of the group of mixer frequencies. In other words, the minimum value of the ACI_dB_2 represents that the power of the wanted signal corresponding to the second mixer frequency is more as compared to the power of the wanted signal corresponding to the first mixer frequency or the third mixer frequency.

Receiving RF signals on television channels of multiple bandwidths as disclosed in the present disclosure may also be described with the following method. The method comprises mixing an RF signal with a mixer frequency for converting the RF signal to an IF signal. Further, the method comprises filtering out a fixed band signal from the IF signal where the fixed band signal has a bandwidth equal to the highest bandwidth amongst the multiple bandwidths. Thereafter, the fixed band signal is converted to a digital signal. Furthermore, the method comprises converting the digital signal into a base band digital signal by mixing a base band conversion frequency in the digital signal which is again filtered for removing noise components. Again, a controlled base band signal is generated by controlling power level of the filtered base band signal. In the above method, the mixer frequency is selected from a group of mixer frequencies based on a function of power of the controlled base band signal. Further, the base band conversion frequency is selected from a group of base band conversion frequencies based on the selection of the mixer frequency.

Selecting the mixer frequency comprises calculating a set of values of the function of power of the controlled base band signal by applying each mixer frequency of the group of mixer frequencies. Further, the set of values of the function of power is stored. Selecting the mixer frequency further comprises selecting an optimum value amongst the set of values of the function of power of the controlled base band signal. Thereafter, the mixer frequency is chosen which corresponds to the optimum value amongst the set of values.

As described above, the embodiments of the disclosure may be embodied in the form of computer-implemented processes and apparatuses for receiving RF signals on television channels of multiple bandwidths in a receiver system 100. Embodiments of the disclosure may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A receiver system capable of receiving RF signals on television channels of multiple bandwidths, the receiver system comprising:
    a tuner for mixing an RF signal with a mixer frequency selected for converting the RF signal into an IF signal;
    an analog IF filter for filtering out a fixed band signal from the IF signal, wherein the bandwidth of the analog IF filter is equal to the highest bandwidth amongst the multiple bandwidths;
    an analog to digital converter capable of converting the fixed band signal into a digital signal;
    a mixer module for converting the digital signal into a base band digital signal using a base band conversion frequency;
    one or more digital filters for filtering the base band digital signal for removing noise components;
    an automatic gain control module coupled to the one or more digital filters for controlling power level of the outputs of the one or more digital filters; and
    a controller connected to the automatic gain control module, the mixer module and the tuner;
    wherein the controller is configured to select the mixer frequency from a group of mixer frequencies based on a function of power of the output of the automatic gain control module, and to provide the mixer frequency to the tuner, and
    wherein the controller is further configured to select the base band conversion frequency from a group of base band conversion frequencies based on the selection of the mixer frequency, and to provide the base band conversion frequency to the mixer module.

2. The receiver system of claim 1, wherein the receiver system further comprises:
    a power function calculating module for calculating a set of values of the function of power of the output of the automatic gain control module by applying each mixer frequency of the group of mixer frequencies to the tuner; and
    a register for storing the set of values of the function of power of the output of the automatic gain control module.

3. The receiver system of claim 2, wherein the controller is further configured to
    choose an optimum value amongst the set of values of the function of power of the output of the automatic gain control module, and
    select the mixer frequency corresponding to the optimum value.

4. The receiver system of claim 1, wherein the analog IF filter is a surface acoustic wave filter.

5. The receiver system of claim 1, wherein the digital filter is a multi-order elliptic filter.

6. A method for receiving RF signals on television channels of multiple bandwidths, the method comprising:
    mixing an RF signal with a mixer frequency for converting the RF signal to an IF frequency signal;

filtering out a fixed band signal from the IF signal, the fixed band signal having a bandwidth equal to the highest bandwidth amongst the multiple bandwidth;

converting the fixed band signal into a digital signal;

converting the digital signal into a base band digital signal by mixing a base band conversion frequency in the digital signal;

filtering the base band digital signal for removing noise components to produce a filtered base band digital signal; and controlling power level of the filtered base band digital signal for generating a controlled base band digital signal;

wherein the mixer frequency is selected from a group of mixer frequencies based on a function of power of the controlled base band signal, and wherein the base band conversion frequency is selected from a group of base band conversion frequencies based on the selection of the mixer frequency.

7. The method of claim 6, wherein selecting the mixer frequency from the group of mixer frequencies comprises:

calculating a set of values of the function of power of the controlled base band signal by applying each mixer frequency of the group of mixer frequencies;

storing the set of values of the function of power;

selecting an optimum value amongst the set of values of the function of power of the controlled base band signal; and choosing the mixer frequency corresponding to the optimum value.

8. A non-transient computer readable medium comprising instructions for receiving RF signals on television channels of multiple bandwidths in a receiver system, the receiver system comprising a tuner for mixing an RF signal with a mixer frequency to convert the RF signal to an IF signal, an analog IF filter, an analog to digital converter to convert the IF signal to a digital signal, a mixer module for converting the digital signal to a base band digital signal, digital filters and automatic gain control module for controlling power level of the base band signal, wherein the instructions when executed by a processor result in the following operations comprising:

calculating a set of values of a function of power of the output of the automatic gain control module by applying each mixer frequency of the group of mixer frequencies to the tuner;

choosing an optimum value amongst the set of values of the function of power of the output of the automatic gain control module;

selecting the mixer frequency corresponding to the optimum value; and selecting a base band conversion frequency, wherein the base band conversion frequency is selected based on value of the mixer frequency, and wherein the base band conversion frequency is used for converting the digital signal into a base band signal.

* * * * *